(12) United States Patent
Nakaya et al.

(10) Patent No.: US 8,317,259 B2
(45) Date of Patent: Nov. 27, 2012

(54) SEAT DEVICE FOR VEHICLE

(75) Inventors: Kouichi Nakaya, Hiroshima (JP); Akihiro Kobayashi, Hiroshima (JP)

(73) Assignee: Mazda Motor Corporation (JP)

( * ) Notice: Subject to any disclaimer, the term of this patent is extended or adjusted under 35 U.S.C. 154(b) by 100 days.

(21) Appl. No.: 12/872,134

(22) Filed: Aug. 31, 2010

(65) Prior Publication Data

US 2011/0074185 A1    Mar. 31, 2011

(30) Foreign Application Priority Data

Sep. 30, 2009  (JP) .................................. 2009-226496

(51) Int. Cl.
    A47C 7/36        (2006.01)
(52) U.S. Cl. ...................... 297/61; 297/216.12; 297/408; 297/113
(58) Field of Classification Search .................... 297/61, 297/408, 113, 216.12; 29/113
    See application file for complete search history.

(56) References Cited

U.S. PATENT DOCUMENTS

| | | | |
|---|---|---|---|
| 3,929,374 A * | 12/1975 | Hogan et al. .................... | 297/61 |
| 6,050,633 A * | 4/2000 | Droual ............................. | 297/61 |
| 7,178,865 B2 * | 2/2007 | Yetukuri et al. .......... | 297/113 X |

FOREIGN PATENT DOCUMENTS

| | | |
|---|---|---|
| DE | 195 11 135 C1 | 4/1996 |
| DE | 197 53 540 A1 | 6/1999 |
| DE | 101 13 091 A1 | 10/2002 |
| JP | 2008-273445 A | 11/2008 |

OTHER PUBLICATIONS

The Extended European Search Report dated Dec. 6, 2010; Application No. 10008847.5-2424.

* cited by examiner

*Primary Examiner* — Anthony D Barfield
(74) *Attorney, Agent, or Firm* — Studebaker & Brackett PC; Donald R. Studebaker

(57) ABSTRACT

There are provided a seatback supporting backs of plural passengers seated on a bench type of seat cushion, a headrest provided at an upper portion of a first portion of the seatback and supporting a head of the passenger seated in front of the first portion, a pressure-receiving portion provided at a second portion of the seatback which is arranged beside the first portion so as to move rearwardly when being pressed by a rearward move of the passenger seated in front of the second portion, and a headrest moving mechanism provided to connect the pressure-receiving portion to the headrest so that the headrest is moved forwardly or upwardly in accordance with a rearward move of the pressure-receiving portion. Accordingly, the passenger's head can be protected with a simple structure.

7 Claims, 6 Drawing Sheets

SEAT DEVICE FOR VEHICLE

BACKGROUND OF THE INVENTION

The present invention relates to a seat device for a vehicle.

Conventionally, a vehicle, such as an automotive vehicle, in which a headrest which is provided at a seat to support a head of a passenger is moved forwardly at a vehicle rear collision in order to suppress a rearward move of the passenger's head for protection of the passenger's head, has been developed.

Japanese Patent Laid-Open Publication No. 2008-273445, for example, discloses a seat device, in which a rear parcel shelf is disposed in back of a seatback supporting a back of a passenger, a headrest support portion which projects forwardly from a front face of the rear parcel shelf is provided at a rear parcel trim which covers over the rear parcel shelf, and the seatback is supported at the rear parcel shelf via a spring provided between the rear parcel shelf and the seatback. In this seat device, when the vehicle has a rear collision, the rearward move of the headrest is suppressed by contacting of the headrest support portion with the headrest. Meanwhile, the seatback moves rearwardly, compressing the spring, and the headrest moves forwardly relatively to the seatback, so that the passenger's head can be restrained from moving rearwardly relatively to the passenger's back.

According to the seat device disclosed in the above-described patent document, the headrest is controlled to move forwardly relatively to the seatback by utilizing the rear parcel trim and the rear parcel shelf arranged in back of the seatback. Therefore, in case the rear parcel trim and the like are not arranged in back of the seatback, this seat device may not be applicable to such a vehicle.

SUMMARY OF THE INVENTION

The present invention has been devised in view of the above-described problem, and an object of the present invention is to provide a seat device for a vehicle which can protect the driver's head properly with a simple structure, without utilizing the above-described rear parcel trim and the like.

According to the present invention, there is provided a seat device for a vehicle, comprising a bench type of seat cushion for plural passengers, a seatback supporting backs of the plural passengers seated on the bench type of seat cushion, the seatback comprising a first portion and a second portion which are arranged side by side, a headrest provided at an upper portion of the first portion of the seatback, the headrest supporting a head of the passenger seated in front of the first portion of the seatback, a pressure-receiving portion provided at the second portion of the seatback so as to move rearwardly when being pressed by a rearward move of the passenger seated on the bench type of seat cushion in front of the second portion of the seatback, and a headrest moving mechanism provided to connect the pressure-receiving portion to the headrest provided at the upper portion of the first portion of the seatback so that the headrest is moved forwardly or upwardly in accordance with a rearward move of the pressure-receiving portion.

According to the present invention, since the headrest is moved forwardly or upwardly at the vehicle rear collision, the rearward move of the passenger's head can be suppressed. Further, since the pressure-receiving portion is provided at the second portion of the seatback which is arranged beside the first portion of the seatback, the headrest provided at the upper portion of the first portion of the seatback can be moved even in case it is difficult to arrange the pressure-receiving portion at the first portion of the seatback, so that the head of the passenger seated in front of the first portion can be protected securely. In case it is possible to arrange the pressure-receiving portion at the first portion, meanwhile, the headrest can be moved by the rearward move of the passenger seated in front of the second portion in addition to the passenger seated in front of the first portion, so that the move of the headrest can be properly secured.

According to an embodiment of the present invention, the seatback comprises a seatback body portion to contact the passenger's back and a reinforcing structure to reinforce the seatback body portion, including a portion extending along an upper edge and both-side edges of the seatback body portion, and the headrest moving mechanism comprises a connection portion to connect the pressure-receiving portion to the headrest and a swing axis which is provided at an upper portion of the reinforcing structure of the seatback to support the connection portion so that the connection portion swings longitudinally, the pressure-receiving portion being connected to a lower portion of the connection portion below the swing axis, the headrest being connected to an upper portion of the connection portion above the swing axis. Thereby, the headrest can be moved forwardly or upwardly in accordance with the rearward move of the pressure-receiving portion with a simpler structure in which the connection portion is supported at the reinforcing structure so as to swing.

According to another embodiment of the present invention, the seat device for a vehicle further comprises an armrest supporting an arm of the passenger, wherein the first portion of the seatback includes an armrest storage portion to store the armrest.

The above-described armrest comprises an armrest body portion to support the passenger's arm and an armrest support axis fixed to a lower end portion of the seatback, the armrest body portion being movable between a storage position where the armrest body portion is stored in the armrest storage portion and a use position where the armrest body portion extends forwardly from the seatback.

Further, the above-described armrest body portion includes a small-article storage portion at an upper part of the armrest body portion located in the storage position, the small-article storage portion having a specified thickness in a longitudinal direction, the connection portion of the headrest moving mechanism and the small-article storage portion being arranged so as not to overlap with each other in an elevation view.

According to the above-described embodiment, it can be prevented that the above-described connection portion of the headrest moving mechanism interferes with the above-described small-article storage portion when the connection portion swings longitudinally. Thus, the forward or upward move of the headrest can be achieved, providing the small-article storage portion at the armrest. Further, since there is no need of providing a large longitudinal distance between the connection portion and the small-article storage portion for avoiding the above-described interference, the thickness of the seatback where the connection portion is arranged can be kept properly thin.

According to another embodiment of the present invention, the connection portion of the headrest moving mechanism comprises an upper swing portion which extends in a seat width direction and is connected to the headrest, a lateral swing portion which extends downward from an end of the upper swing portion in the seat width direction and to which the swing axis is attached, and a middle swing portion which extends from the lateral swing portion in the seat width direction substantially at the same height position as the swing axis, the upper swing portion being arranged at a specified position so as not to interfere with the small-article storage portion when swinging longitudinally around the swing axis, the middle swing portion being arranged at a specified position which is located between the small-article storage portion and the support axis of the armrest located in the storage position and rearwardly from a part of the armrest between the small-article storage portion and support axis. Thereby, the headrest is supported at the respective swing portions stably, so that the stable forward or upward move of the headrest in accordance with the swing of the respective swing portions can be achieved. Further, since the middle swing portion is arranged in back of the armrest, the armrest can be rotated without being hindered by the middle swing portion. Moreover, since the middle swing portion is arranged at the same height position as the swing axis, the longitudinal swinging amount of the middle swing portion can be made as small as possible, so that any interference of the middle swing portion with the armrest can be avoided securely.

According to another embodiment of the present invention, the seat device for a vehicle further comprises a second headrest provided at an upper portion of the second portion of the seatback to support a head of the passenger seated in front of the second portion of the seatback, wherein the headrest moving mechanism connects the pressure-receiving portion to the second headrest provided at the upper portion of the second portion of the seatback so that the second headrest is moved forwardly or upwardly in accordance with the rearward move of the pressure-receiving portion. Thereby, both the first portion and the second portion of the seatback can be moved forwardly or upwardly concurrently in accordance with the rearward move of the pressure-receiving portion at the vehicle rear collision, and the structure can be properly simple without providing any particular mechanism for moving the headrest.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Figure 1:
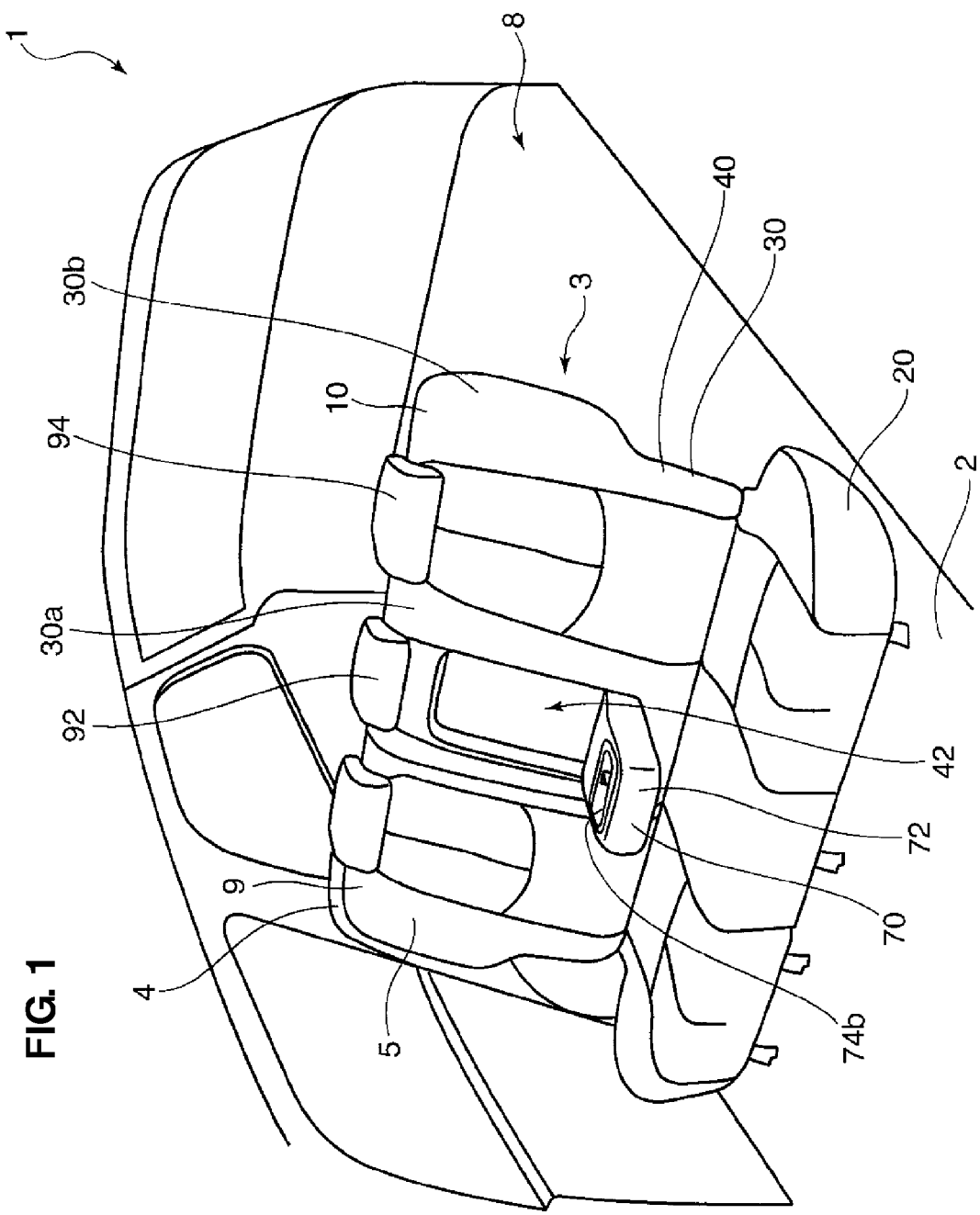
FIG. 1 is a perspective view showing a rear part of a vehicle equipped with a seat device for a vehicle according to an embodiment of the present invention.

FIG. 1 is a schematic perspective view showing a rear part of a vehicle 1 which is equipped with a seat device for a vehicle according to the present invention. In a rear part of the vehicle 1 behind a driver's seat and a passenger's (assistant's) seat, which are not illustrated, a rear seat 3 is disposed on a floor panel 2 which forms a bottom of a vehicle compartment. The rear seat 3 is configured to be available for sitting of three passengers. This rear seat 3 comprises a seat for a single passenger 9 and a bench type of seat for two passengers 10, which are arranged side by side in a vehicle width direction. Herein, an example in which the bench type of seat 10 performs as the above-described seat device for a vehicle will be described. Vehicle-body frames 4, 4 are provided at both sides of the rear seat 3 in the vehicle width direction. A baggage compartment 8 is formed in back of the rear seat 3.

Figure 2:
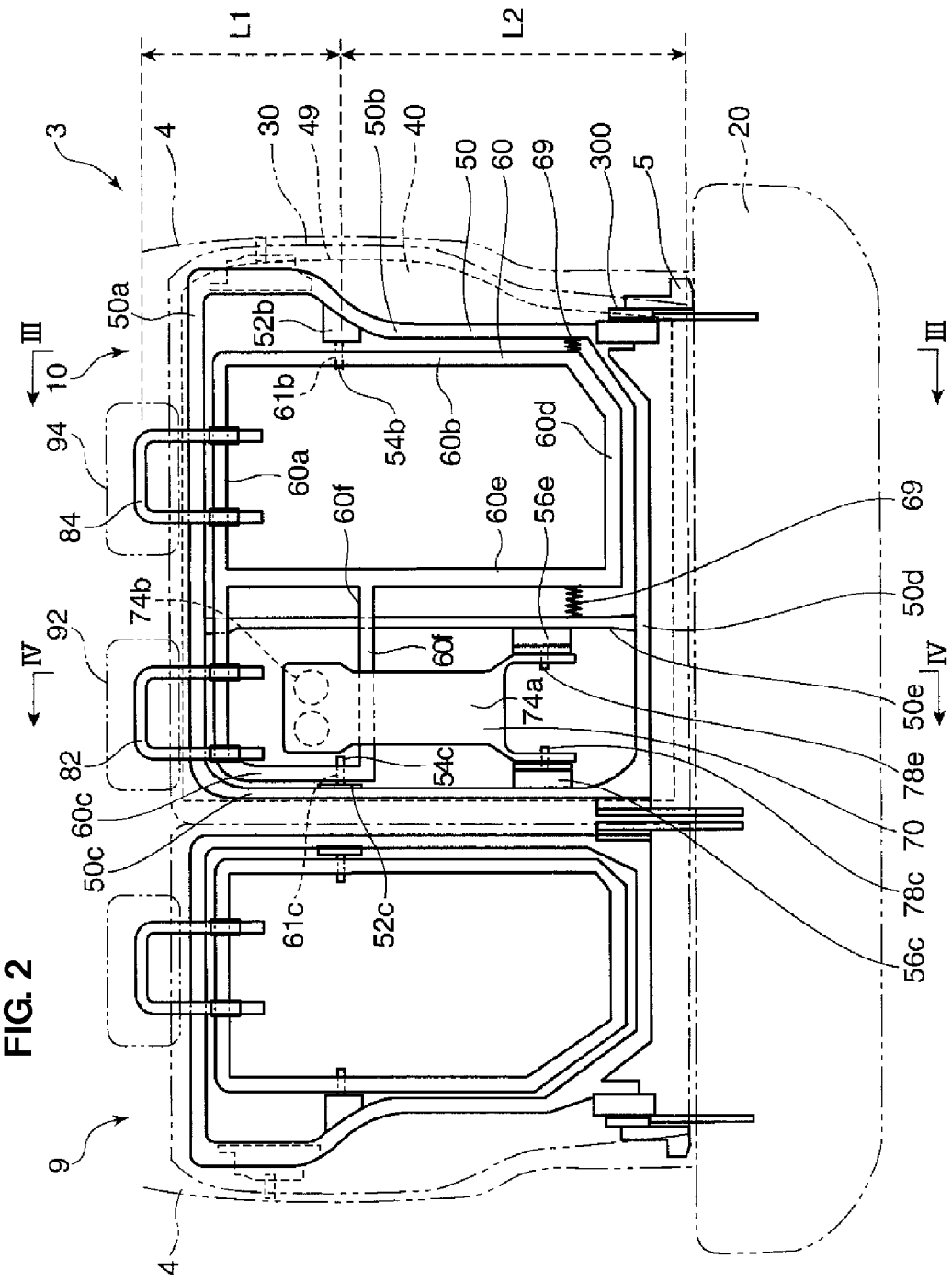
FIG. 2 is a schematic structural diagram of the seat device for a vehicle shown in FIG. 1.

The bench type of seat 10 comprises, as shown in FIGS. 1 and 2, a seat cushion (bench type of seat cushion) 20 for passengers, a seatback 30 which supports backs of the passengers seated on the seat cushion 20, an armrest 70, a swing frame (connection portion) 60, and two headrests 92, 94 which are provided at an upper portion of the seatback 30, respectively.

As described above, the bench type of seat 10 is for sitting of two passengers, the seat cushion 20 has a width which is wide enough to have at least two passengers seated, and the seatback 30 has a width which is wide enough to support backs of at least two passengers. These seat cushion 20 and seatback 30 extend in the vehicle width direction. Herein, the vehicle width direction matches a seat width direction. Part of the bench type of seat 10 which is located on the side of the seat for a single passenger 9 (i.e., a left side in FIG. 2) functions as a central seat which is positioned in the center of the vehicle 1. This central seat may be used as an additional seat for a third passenger in case a passenger is seated in the outside part (on the right side in FIG. 2) of the bench type of seat 10 and another passenger is seated in the seat for a single passenger 9. A "first portion" of the seatback 30 specified in claims corresponds to a seatback of the above-described central seat of the bench type of seat 10 which is located on the side of the seat for a single passenger 9 (i.e., the left side in FIG. 2), and a "second portion" of the seatback 30 specified in claims corresponds to a seatback of the outside part (on the right side in FIG. 2) of the bench type of seat 10. Hereinafter, the vehicle width direction will be referred to as "lateral direction," and the side of the seat for a single passenger 9 will be referred to as "left side" and the side of the bench type of seat 10 will be referred to as "right side."

The central headrest 92 is provided at an upper portion of a left-side portion 30a of the seatback 30 which is positioned at the center of the vehicle 1 so as to support a head of the passenger who is seated in the above-described central seat, facing a back thereof to the left-side portion 30a. The right-side headrest (second headrest) 94 is provided at an upper portion of a right-side portion 30b of the seatback 30 which is positioned at the right-side portion of the seatback 30 so as to support a head of the passenger who is seated in the right-side seat, facing a back thereof to the right-side portion 30b.

A seat cushion frame (not illustrated) is stored inside the seat cushion 20. The seat cushion 20 is fixed to a specified height position by the seat cushion frame fixed to the floor panel 2.

The seatback 30 comprises a seatback body portion 40 which forms a contour of the seatback 30 and contacts the back of the passenger. Inside this seatback body portion 40 are stored a seatback frame (reinforcing structure) 50 and a back panel (reinforcing structure) 49 which reinforce the seatback body portion 40. The back panel 49 is a plate-shaped member which expands over a whole area of the seatback body portion 40, and the seatback frame 50 is arranged in front of the back panel 49. Further, an armrest storage portion 42 which is concaved rearwardly so as to store the armrest 70 therein is formed at a left-side portion of the seatback body portion 40. The above-described swing frame 60 is stored inside the seatback body portion 40.

The seatback frame 50 comprises an upper frame 50a, a right frame 50b, a left frame 50c, a lower frame 50d, and a central frame 50e, which are made of a pipe, respectively.

The upper frame 50a extends laterally along an upper edge of the seatback body portion 40 near an upper end of the seatback body portion 40. This upper frame 50a extends over the both ends of the seatback body portion 40. The lower frame 50d extends laterally along a lower edge of the seatback body portion 40 near a lower end of the seatback body portion 40. This lower frame 50d extends over the both ends of the seatback body portion 40. The right frame 50b extends vertically along a right edge of the seatback body portion 40 over a right end of the upper frame 50a and a right end of the lower frame 50d. The left frame 50c extends vertically along a left edge of the seatback body portion 40 over a left end of the upper frame 50a and a left end of the lower frame 50d. The central frame 50e extends vertically over a central portion of the upper frame 50a and a central portion of the lower frame 50d.

A right swing axis (swing axis) 54b which projects to the left side is fixed to an upper portion (a portion above the middle position in a vertical direction) of the right frame 50b via a swing bracket 52b. Meanwhile, a left swing axis (swing axis) 54c which projects to the right side is fixed to an upper portion of the left frame 50c via a swing bracket 52c. These right and left swing axes 54b, 54d support the above-described swing frame 50 so that the swing frame 50 can swing longitudinally. Armrest fixing brackets 56c, 56e which fix the armrest 70 are attached to lower end portions of the left and central frames 50c, 50e, respectively.

The seatback 30 is coupled to the above-described seat cushion frame so that it can move between a standing position where it stands upwardly from the seat cushion 20 and a folding position where it extends horizontally folding onto an upper face of the seat cushion 20. A holding device 300 to hold the seatback 30 in its standing position is provided at a lower end portion of the right frame 50b. This holding device 300 can be operated by the passenger, and when the holding of the seatback 30 by the holding device 300 is released by the passenger, the seatback 30 can be allowed to move.

Figure 4:
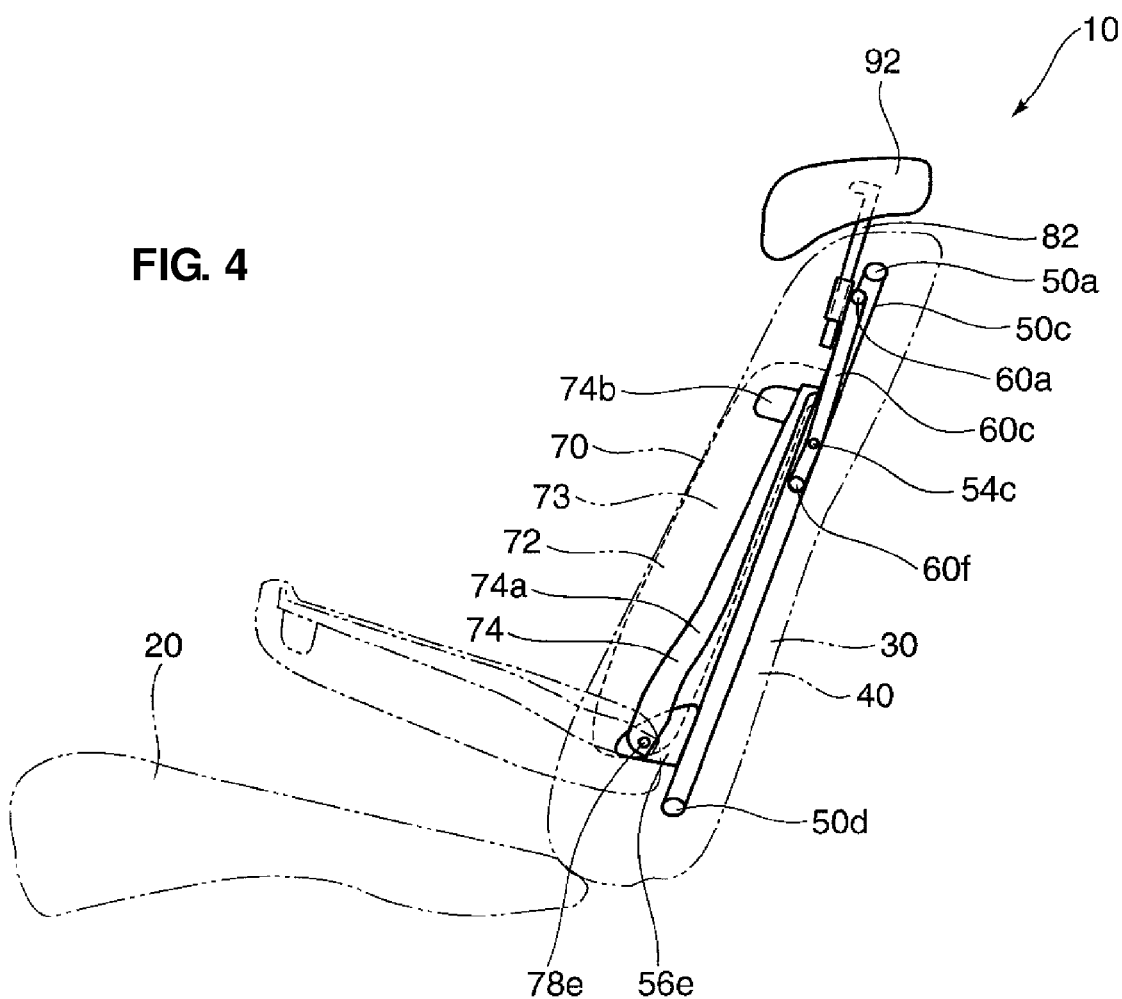
FIG. 4 is a sectional view taken along line IV-IV of FIG. 2.

The armrest 70 supports an arm of the passenger. This armrest 70 is provided at a central-seat portion of the seatback 30 so as to support the arm of the passenger who is seated in the right-side seat with a back contacting the right-side portion 30b of the seatback 30. The armrest 70 comprises an armrest body portion 72 and armrest support axes 78c, 78e. The armrest 70 is rotatably fixed to the above-described armrest fixing brackets 56c, 56e. Specifically, the armrest support axes 78c, 78e are fixed to the armrest fixing brackets 56c, 56e so that the armrest body portion 72 can move between a use position (shown by a broken line and a solid line) where it extends horizontally and supports the passenger's arm and a storage position (shown by a two-dotted line) where it extends vertically and is stored in the armrest storage portion 42, as shown in FIG. 4. The armrest 70 supports the arm of the passenger seated in the right-side seat in the use position, and it also supports the back of the passenger seated in the central seat when the armrest 70 is in the storage position having its front face flush with a front face of the seatback 30.

The armrest body portion 72 comprises a pad portion 73 which forms its shape and is made from a soft material, such as urethane, and an armrest frame 74 which is stored inside the pad portion 73 and made from a hard material. The armrest body portions 78c, 78e are connected to an end portion of the armrest frame 74 which is located at a lower position when the armrest body portion 72 is in the storage position.

The armrest frame 74 comprises a plate portion 74a which extends vertically and a small-article storage portion 74b which is provided at an upper end of the plate portion 74a so as to project forward when the armrest body portion 72 is in the storage position. This small-article storage portion 74b functions as a cup holder, for example. Herein, the armrest body portion 72 in the storage position extends from a lower end portion of the seatback 30 to the upper portion of the seatback 30, and the small-article storage portion 74b is positioned at the upper portion of the seatback 30. The plate portion 74a is a thin plate member, and its longitudinal thickness (when the armrest body portion is in the storage position) is set to be smaller than that of the small-article storage portion 74b.

The swing frame 60 supports the central headrest 92 and the right headrest 94 so that they can swing longitudinally. The swing frame 60 comprises an upper swing frame (upper swing portion) 60a, a right swing frame 60b, a left swing frame (lateral swing portion) 60c, a lower swing frame (pressure-receiving portion) 60d, a central swing frame 60e, and a middle swing frame (middle swing portion) 60f, which are made of a pipe, respectively. This swing frame 60 is arranged in an area enclosed by the upper frame 50a, the left frame 50c, the right frame 50b, and the lower frame 50d of the seatback frame 50.

The above-described upper swing frame 60a is positioned slightly below the upper frame 50a and extends along this frame 50a, i.e., an upper edge of the seatback body portion 40. This upper swing frame 60a extends from the right frame 50b, i.e., the right end of the seatback body portion 40, to the left frame 50c, i.e., the left end of the seatback body portion 40.

The above-described lower swing frame 60d is positioned near the lower end portion of the seatback body portion 40 and slightly above of the lower frame 50d, and extends laterally along this lower frame 50d, i.e., a lower edge of the seatback body portion 40. This lower swing frame 60d extends from the right frame 50b, i.e., the right end of the seatback body portion 40, to a position slightly on the right of the central frame 50e, i.e., a central portion of the seatback body portion 40 in the lateral direction.

The above-described right swing frame 60b is positioned slightly on the right of the right frame 50b and extends vertically along this frame 50b, i.e., a right edge of the seatback body portion 40. This right swing frame 60b extends over a right end of the upper swing frame 60a and a right end of the lower swing frame 60d.

The above-described left swing frame 60c is positioned slightly on the left of the left frame 50c and extends vertically along this frame 50c, i.e., a left edge of the seatback body portion 40. This left swing frame 60c extends from a left end of the upper swing frame 60a to a position below the small-article storage portion 74b of the armrest 70 and slightly below the left swing axis 54c.

The above-described central swing frame 60e is located at a position which is slightly on the right of the central frame 50e and does not overlap with the central frame 50e in a front view, and extends vertically along this frame 50e. This central swing frame 60e extends over a central portion of the upper swing frame 60a in the lateral direction and a left end of the lower swing frame 60d.

The above-described middle swing frame 60f extends laterally from a lower end of the left swing frame 60c to the central swing frame 60e. As described above, the left swing frame 60c extends to a position which is below the small-article storage portion 74b of the armrest 70 and slightly below the left swing axis 54c, and this middle swing frame 60f extends laterally below the small-article storage portion 74b of the armrest 70 and slightly below the left swing axis 54c.

The armrest storage portion 42 is formed between the left swing frame 60c and the central swing frame 60e, and the central swing frame 60f extends laterally behind the armrest storage portion 42. While the middle swing frame 60f extends straightly in the present embodiment, it may curve rearwardly avoiding the armrest storage portion 42, for example. Herein, the middle swing frame 60f is arranged below the small-article storage portion 74b so that the middle swing frame 60f and the small-article storage portion 74b do not overlap with each other in the elevation view. Thus, any interference between the middle swing frame 60f and the small-article storage portion 74b is avoided, so that it can be prevented that storage of the armrest 70 in the armrest storage portion 42 is hindered or the small-article storage portion 74b is damaged. Further, the armrest storage portion 42 is formed below the upper swing frame 60a and the upper swing frame 60a is positioned above the armrest 70, so that it does not interfere with the armrest 70 when the swing frame 60 swings as described below.

To the upper swing frame 60a are connected a central headrest support frame 82 which has an upper end to which the central headrest 92 is fixed, and a right headrest support frame 84 which has an upper end to which the right headrest 94 is fixed. The central headrest support frame 82 is connected to a specified portion of the upper swing frame 60a between the left swing frame 60c and the central swing frame 60e. The right headrest support frame 84 is connected to a specified portion of the upper swing frame 60a between the central swing frame 60e and the right swing frame 60b. Thus, the respective headrests 92, 94 are supported at the upper portion of the seatback 30 by the upper swing frame 60a, i.e., the swing frame 60.

A right swing-axis insertion hole 61b is formed at the upper portion of the right swing frame 60b. A left swing-axis insertion hole 61c is formed at the upper portion of the left swing frame 60c. The above-described right and left swing axes 54b, 54c are inserted into these insertion holes 61b, 61c, respectively. Thus, the right and left swing frames 60b, 60c, i.e., the swing frame 60, are supported so as to swing longitudinally around the right and left swing axes 54b, 54a.

The respective swing axes 54b, 54c are located at a specified position so that a ratio of a vertical distance L1 (see FIG. 2) between a central portion of the headrests 92, 94 and the swing axes 54b, 54c to a vertical distance L2 (see FIG. 2) between the swing axes 54b, 54c and a lower end portion of the seatback 30 where the lower swing frame 50d is provided can be 1:2. The swing frame 60 swings around this specified position. While the ratio of L1 to L2 should not be limited to the above-described ratio 1:2, it is preferable that this ratio L1:L2 be seat at about 1.5 to 2.

In the present embodiment, the right swing frame 60b, central swing frame 60e, and left swing frame 60c are formed so that they bend at a specified position corresponding to the swing axes 54b, 54c in the side view so that their upper portions are located forwardly.

To respective lower end portions of the right and left swing frames 60b, 60e are attached return springs 69, 69 which connect the right swing frame 60b to the right frame 50b, and the central swing frame 60e to the central frame 50e.

Hereinafter, the bench type of seat 10 described above will be described. Herein, it is considered that the armrest 70 is in the storage position and the passengers are seated in both the central seat and the right-side seat.

When the vehicle rear collision happens, an impact force acts on the seatback 30 forwardly, so that the passengers are pressed against the seatback 30 with a relatively strong force. Specifically, the passenger seated in the central seat is pressed against the armrest in the storage position, and the passenger seated in the right-side seat is pressed against the right-side portion of the seatback 30. Accordingly, the waist portion of the passenger applies a rearward force to the above-described lower swing frame 60d arranged at the right-side portion of the seatback 30. The swing frame 60 swings receiving this force. That is, the lower part of the swing frame 60 including the lower swing frame 60d below the swing axes 54b, 54c moves rearwardly. Thus, in the present embodiment, the lower swing frame 60d functions as the pressure-receiving portion which is pressed by the above-described rearward move of the passenger and moves rearwardly. Meanwhile, the upper part of the swing frame 60 including the upper swing frame 60a above the swing axes 54b, 54c moves forwardly.

Figure 3:
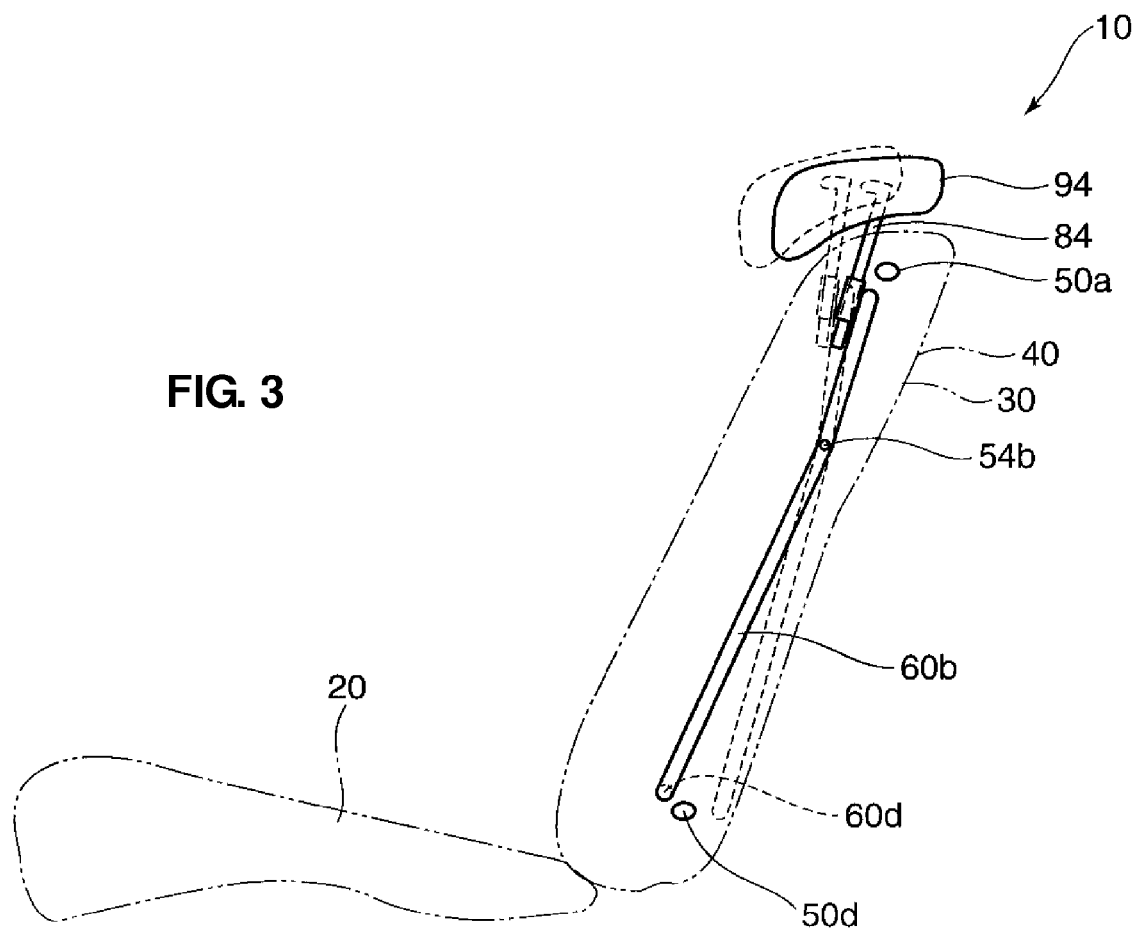
FIG. 3 is a sectional view taken along line III-III of FIG. 2.

When the upper swing frame 60a moves forwardly, the right headrest support frame 84 and the right headrest 94 which are connected to the upper swing frame 60a move forwardly. Specifically, the right headrest 94 swings around the swing axes 54b, 54c and moves obliquely forwardly and upwardly from its position shown by a solid line to its position shown by a broken line in FIG. 3. As the right headrest 94 moves like this, the amount of the rearward move of the head of the passenger seated in the right-side seat is made properly small, so that the passenger's head can be protected properly. Herein, while there is a case in which the passenger's body moves upwardly at the vehicle rear collision, the right headrest 94 moves upwardly. Accordingly, the amount of the rearward move of the passenger's head is suppressed in this case as well.

Figure 5:
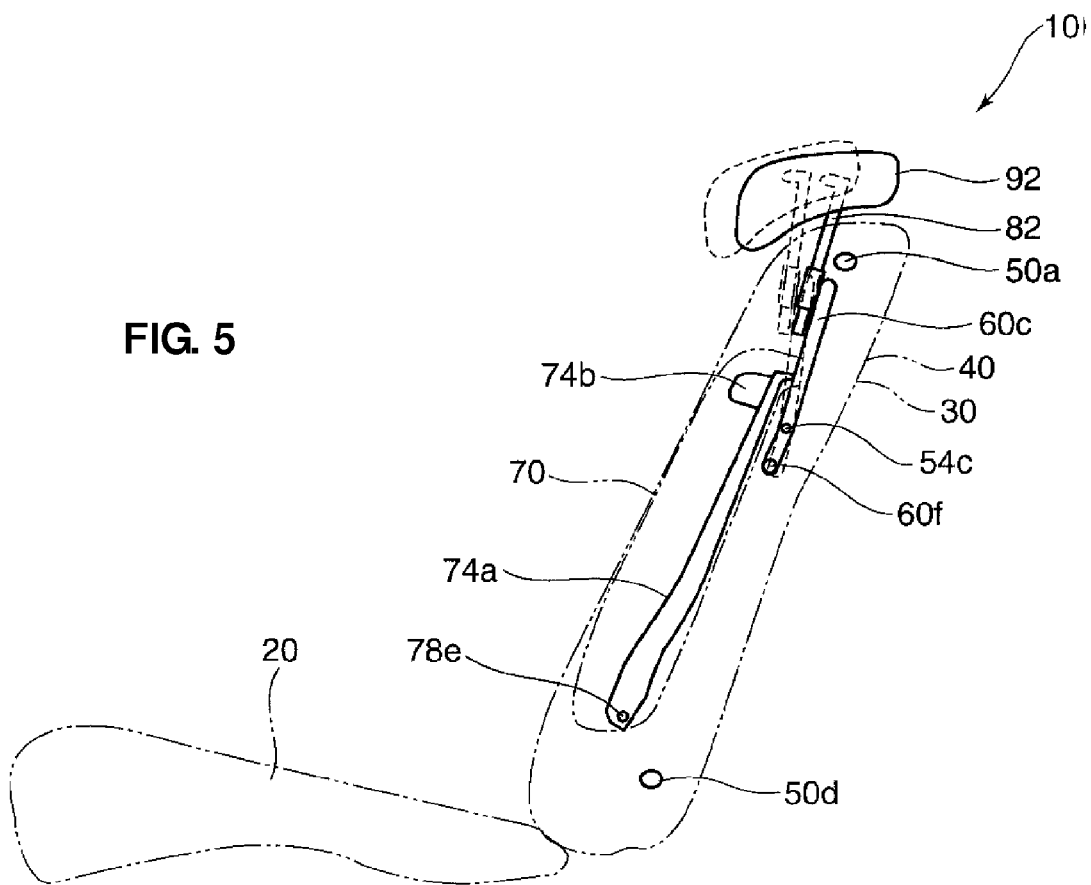
FIG. 5 is a sectional view explaining a move of the seat device for a vehicle.

Further, when the upper swing frame 60a moves forwardly, the central headrest support frame 82 and the central headrest 92 in addition to the right headrest support frame 84 and the right headrest 94 move obliquely forwardly and upwardly from their position shown by a solid line to their position shown by a broken line in FIG. 5. Accordingly, the move amount of the head of the passenger seated in the central seat is suppressed as well.

Herein, while the middle swing frame 60f moves rearwardly, it is arranged near the left swing axis 54c. Accordingly, the amount of rearward move of the middle swing frame 60f is properly small, so the rearward move of the middle swing frame 60f can be achieved even in a part of the seatback 30 which is positioned behind the armrest storage portion 42 and has a relatively small thickness. Further, no interference of the upper swing frame 60a with the armrest 70 occurs, so the forward move of the upper swing frame 60a can be achieved.

As described above, according to the bench type of seat 10, the passenger seated in the right-side seat is pressed against the seatback 30 and thereby the load is applied to the lower swing frame 60d, so that the central headrest 92 and the right headrest 94 move obliquely forwardly and upwardly. Thereby, the head of the passenger seated in the central seat can be protected without providing any pressure-receiving portion, such as the frame which is arranged at the lower portion of the central portion of the seatback 30 to receive the load by the passenger. That is, the armrest storage portion 42 to store the armrest 70 in the seatback 30 can be provided, and also the central headrest 92 arranged at the central seat can be moved with a simple structure. Further, the passengers seated in the central and right-side seats can be respectively protected without providing any particular mechanisms of moving the respective headrests 92, 94. In the present embodiment, the swing frame 60, swing axes 54b, 54c and headrest support frames 82, 84 function as the headrest moving mechanism to connect the lower swing frame 60*d* as the pressure-receiving portion to the headrests 92, 94 so that the headrests 92, 94 are moved forwardly or upwardly.

Herein, in case the load by the passenger returns to a specified value or smaller, the swing frame 60 is returned to its original position before the vehicle rear collision by a return force of the above-described springs 99. Accordingly, the central headrest 92 and the right headrest 94 are also returned to their original positions before the vehicle rear collision.

The number of passengers which may be seated on the seat cushion 20 is not limited to the above-described one. Also, the number of headrest is not limited to the above-described one. Further, the specific shape of the seatback frame 50 is not limited to the above-described one, either. However, if the left frame 50*c* and the right frame 50*b* which extend along the both-side edges of the seatback are provided, and the swing axes 54*b*, 54*c* are fixed to these frames 50*b*, 50*c* so that the swing frame 60 is supported by the swing axes 54*b*, 54*c*, the swing frame 60 can be supported stably.

Figure 6:
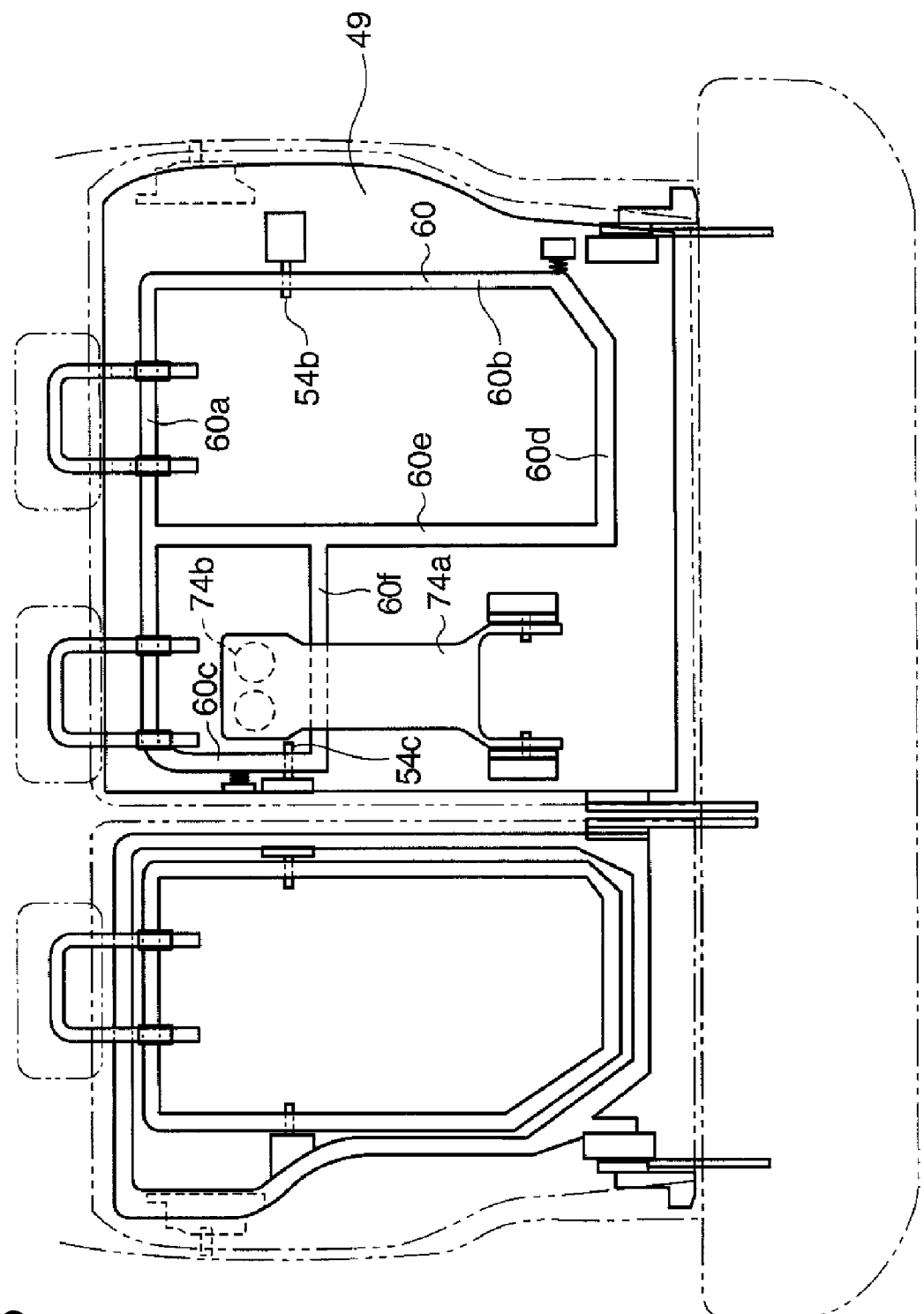
FIG. 6 is a schematic structural diagram of the seat device for a vehicle according to a modified embodiment of the present invention.

Moreover, the right frame 50*b* and the left frame 50*c* may be fixed to the above-described back panel 49 via a bracket or the like as shown in FIG. 6. In this case, further, the back panel 49 having beads may be used and the above-described seatback frame 50 may be omitted.

The armrest 70 may be omitted. Further, the swing frame 60 is not limited to the above-described specific structure. For example, the above-described central swing frame 60*e* and middle swing frame 60*f* which constitute part of the swing frame 60 may be omitted. However, these may be more effective to increase the rigidity of the swing frame 60 and stabilize the swing move of the swing frame 60.

In case the armrest 70 is provided, if the middle swing frame 60*f* is positioned so as not to overlap with the small-article storage portion 74*b* in the elevation view, any interference between the small-article storage portion 74*b* which is made from a relatively hard material and the middle swing frame 60*f* can be avoided without making the longitudinal thickness of the seatback body portion 40 improperly thick. Thereby, any damage of the small-article storage portion 74*b* or the middle swing frame 60*f* may be prevented, and the armrest 70 may be stored smoothly in the armrest storage portion 42.

Further, if the middle swing frame 60*f* is arranged slightly below the left swing axis 54*c*, i.e., near the left swing axis 54*c*, the amount of rearward move of the middle swing frame 60*f* can be made properly small. Thereby, the middle swing frame 60*f* can be arranged rearwardly in the seatback body portion 40 without making the longitudinal thickness of the seatback body portion 40 improperly thick. Herein, the middle swing frame 60*f* may be arranged slightly above the left swing axis 54*c* or substantially at the same height as the left swing axis 54*c* instead.

The present should not be limited to the above-described embodiments, and any other modifications or improvements can be applied within the scope of a spirit of the present invention.

What is claimed is:

1. A seat device for a vehicle, comprising:
a bench type of seat cushion for plural passengers seated side by side in a vehicle width direction;
a seatback supporting backs of the plural passengers seated on the bench type of seat cushion side by side, the seatback comprising a first portion and a second portion which are arranged side by side in the vehicle width direction, the first portion of the seatback supporting the back of one of the plural passengers seated side by side on the bench type of seat cushion, the second portion of the seatback supporting the back of the other of the passengers seated side by side on the bench type of seat cushion;
a headrest provided at least at an upper portion of said first portion of the seatback, the headrest supporting a head of said one of the passengers seated on the bench type of seat cushion in front of the first portion of the seatback;
a pressure-receiving portion provided at said second portion of the seatback so as to move rearwardly when being pressed by a rearward move of said other of the passengers seated on the bench type of seat cushion in front of the second portion of the seatback; and
a headrest moving mechanism provided to connect said pressure-receiving portion to said headrest provided at the upper portion of the first portion of the seatback so that the headrest is moved forwardly or upwardly in accordance with a rearward move of the pressure-receiving portion, the headrest moving mechanism includes a linkage mechanism which extends substantially laterally in the vehicle width direction from a position at said second portion of the seatback to another position at said first portion of the seatback for connection of the pressure-receiving portion to the headrest.

2. The seat device for a vehicle of claim 1, wherein said seatback comprises a seatback body portion to contact the passenger's back and a reinforcing structure to reinforce the seatback body portion, including a portion extending along an upper edge and both-side edges of the seatback body portion, and said headrest moving mechanism comprises a connection portion to connect said pressure-receiving portion to said headrest and a swing axis which is provided at an upper portion of said reinforcing structure of the seatback to support the connection portion so that the connection portion swings longitudinally, the pressure-receiving portion being connected to a lower portion of the connection portion below the swing axis, the headrest being connected to an upper portion of the connection portion above the swing axis.

3. The seat device for a vehicle of claim 2, further comprising an armrest supporting an arm of the passenger, wherein said first portion of the seatback includes an armrest storage portion to store the armrest.

4. The seat device for a vehicle of claim 3, wherein said armrest comprises an armrest body portion to support the passenger's arm and an armrest support axis fixed to a lower end portion of the seatback, the armrest body portion being movable between a storage position where the armrest body portion is stored in said armrest storage portion and a use position where the armrest body portion extends forwardly from the seatback.

5. The seat device for a vehicle of claim 4, wherein said armrest body portion includes a small-article storage portion at an upper part of the armrest body portion located in the storage position, the small-article storage portion having a specified thickness in a longitudinal direction, said connection portion of the headrest moving mechanism and the small-article storage portion being arranged so as not to overlap with each other in an elevation view.

6. The seat device for a vehicle of claim 5, wherein said connection portion of the headrest moving mechanism comprises an upper swing portion which extends in a seat width direction and is connected to said headrest, a lateral swing portion which extends downward from an end of the upper swing portion in the seat width direction and to which said swing axis is attached, and a middle swing portion which extends from the lateral swing portion in the seat width direction substantially at the same height position as the swing axis, the upper swing portion being arranged at a specified position so as not to interfere with said small-article storage portion when swinging longitudinally around the swing axis, the middle swing portion being arranged at a specified position which is located between the small-article storage portion and the support axis of the armrest located in the storage position and rearwardly from a part of the armrest between the small-article storage portion and support axis.

7. A seat device for a vehicle, comprising:
- a bench type of seat cushion for plural passengers seated side by side in a vehicle width direction;
- a seatback supporting backs of the plural passengers seated on the bench type of seat cushion side by side, the seatback comprising a first portion and a second portion which are arranged side by side in the vehicle width direction, the first portion of the seatback supporting the back of one of the plural passengers seated side by side on the bench type of seat cushion, the second portion of the seatback supporting the back of the other of the passengers seated side by side on the bench type of seat cushion;
- a first headrest provided at an upper portion of said first portion of the seatback, the headrest supporting a head of said one of the passengers seated on the bench type of seat cushion in front of the first portion of the seatback;
- a second headrest provided at an upper portion of said second portion of the seatback, the second headrest supporting a head of said other of the passengers seated on the bench type of seat cushion in front of the second portion of the seatback;
- a pressure-receiving portion provided at said second portion of the seatback so as to move rearwardly when being pressed by a rearward move of said other of the passengers seated on the bench type of seat cushion in front of the second portion of the seatback; and
- a headrest moving mechanism provided to connect said pressure-receiving portion to said first and second headrests provided at the respective upper portions of the first and second portions of the seatback so that both the first and second headrests are moved forwardly or upwardly in accordance with a rearward move of the pressure-receiving portion.

* * * * *